United States Patent
Chen et al.

(10) Patent No.: US 9,480,005 B2
(45) Date of Patent: Oct. 25, 2016

(54) SYSTEM AND METHOD FOR COMMON ATTRIBUTES IN HESSID AND THE ASSOCIATED QUERIES

(71) Applicant: FutureWei Technologies, Inc., Plano, TX (US)

(72) Inventors: Bin Chen, Schaumburg, IL (US); George Calcev, Hoffman Estates, IL (US); Hanan Ahmed, Westland, MI (US); Kaidi Huang, Chengdu (CN)

(73) Assignee: Futurewei Technologies, Inc., Plano, TX (US)

( * ) Notice: Subject to any disclaimer, the term of this patent is extended or adjusted under 35 U.S.C. 154(b) by 97 days.

(21) Appl. No.: 14/072,551

(22) Filed: Nov. 5, 2013

(65) Prior Publication Data
US 2014/0126563 A1    May 8, 2014

Related U.S. Application Data

(60) Provisional application No. 61/723,269, filed on Nov. 6, 2012.

(51) Int. Cl.
| | |
|---|---|
| *H04W 48/14* | (2009.01) |
| *H04W 48/16* | (2009.01) |
| *H04W 48/20* | (2009.01) |
| *H04W 84/12* | (2009.01) |

(52) U.S. Cl.
CPC ............ *H04W 48/14* (2013.01); *H04W 48/16* (2013.01); *H04W 48/20* (2013.01); *H04W 84/12* (2013.01)

(58) Field of Classification Search
CPC ... H04W 48/14; H04W 48/16; H04W 48/20; H04W 84/12
See application file for complete search history.

(56) References Cited

U.S. PATENT DOCUMENTS

| | | | |
|---|---|---|---|
| 2007/0064660 A1 | 3/2007 | Qi et al. | |
| 2007/0206527 A1 | 9/2007 | Lo et al. | |
| 2011/0299481 A1* | 12/2011 | Kim et al. | 370/329 |
| 2012/0076117 A1 | 3/2012 | Montemurro et al. | |
| 2012/0165056 A1* | 6/2012 | Kim et al. | 455/509 |
| 2012/0191780 A1 | 7/2012 | Sato et al. | |
| 2012/0281609 A1* | 11/2012 | Kasslin | H04W 48/14 370/312 |

(Continued)

FOREIGN PATENT DOCUMENTS

| | | |
|---|---|---|
| CN | 101668290 A | 3/2010 |
| CN | 102612052 A | 7/2012 |

(Continued)

OTHER PUBLICATIONS

"Use of Non-Native GAS in Multiple BSSID Deployments", Dave Stephenson, Cisco Systems, May 2009.*

(Continued)

*Primary Examiner* — Habte Mered
(74) *Attorney, Agent, or Firm* — Slater Matsil, LLP

(57) ABSTRACT

Mobile stations can query independent basic service set (BSS) parameters of a group of Access Points (APs) by setting a Pre-Association Message Exchange BSSID Independent (PAME-BI) bit during Wi-Fi discovery. The PAME-BI bit may be included in a Generic Advertisement Service (GAS) request to indicate that an Access Network Query Protocol (ANQP) request carried by the GAS request is querying both independent and dependent BSS parameters. In some embodiments, the PAME-BI bit is included as a field in the ANQP query, rather than the GAS request message.

23 Claims, 9 Drawing Sheets

(56) References Cited

U.S. PATENT DOCUMENTS

2013/0072248 A1* 3/2013 Bajko .................. H04W 48/14
455/515
2013/0316705 A1* 11/2013 Kneckt et al. ............. 455/435.1

FOREIGN PATENT DOCUMENTS

| JP | 2011004225 A | 6/2011 |
|---|---|---|
| WO | 2011155693 A2 | 12/2011 |
| WO | 2013037064 A1 | 3/2013 |
| WO | 2014063095 A1 | 4/2014 |

OTHER PUBLICATIONS

Part 11: Wireless LAN Medium Access Control (MAC) and Physical Layer (PHY) Specifications, IEEE, Feb. 25, 2011.*
"IEEE Standard for Information Technology—Telecommunications and information exchange between systems—Local and metropolitan area networks—Specific requirements Part 11: Wireless LAN Medium Access Control (MAC) and Physical Layer (PHY) Specifications," IEEE Draft P802.11-REVmb™/D12, Nov. 2011, 2910 pages.
"IEEE Standard for Information Technology—Telecommunications and information exchange between systems Local and metropolitan area networks—Specific requirements Part 11: Wireless LAN Medium Access Control (MAC) and Physical Layer (PHY) Specifications," IEEE Std 802.11™-2012, Mar. 29, 2012, 2793 pages.
International Search Report and Written Opinion received in International Application No. PCT/CN2013/086636, mailed Jan. 30, 2014, 10 pages.
Extended European Search Report received in European Application No. 13853305.4 dated Nov. 16, 2015, 11 pages.
IEEE, "IEEE Standard for Information Technology—Telecommunications and information exchange between systems Local and metropolitan area networks—Specific requirements Part 11: Wireless LAN Medium Access Control (MAC) and Physical Layer (PHY) Specifications," Amendment 9: Interworking with External Networks, IEEE Std 802.11u, Feb. 25, 2011, 208 pages.
Wi-Fi Alliance, Hotspot 2.0 (Release 2) Technical Specification Version 1.1.0, 207 pages, 2015.

* cited by examiner

| Order | Information |
|---|---|
| 0 | Category |
| 1 | Action |
| 2 | Dialog Token |
| 3 | Advertisement Protocol Element |
| 4 | Query Request Length |
| 5 | Query Request |

FIG. 7

(Prior Art)

| Order | Information |
|---|---|
| 0 | Category |
| 1 | Action |
| 2 | Dialog Token |
| 3 | Status Code |
| 4 | GAS Comeback Delay |
| 5 | Advertisement Protocol Element |
| 6 | Query Response Length |
| 7 | Query Response (optional) |

FIG. 8

(Prior Art)

| ANQP-ELEMENT NAME | INFO ID | ANQP-ELEMENT (SUBCLAUSE) |
|---|---|---|
| RESERVED | 0-255 | N/A |
| QUERY LIST | 256 | 8.4.4.1 |
| CAPABILITY LIST | 257 | 8.4.4.2 |
| VENUE NAME | 258 | 8.4.4.3 |
| EMERGENCY CALL NUMBER | 259 | 8.4.4.4 |
| NETWORK AUTHENTICATION TYPE | 260 | 8.4.4.5 |
| ROAMING CONSORTIUM | 261 | 8.4.4.6 |
| IP ADDRESS TYPE AVAILABILITY | 262 | 8.4.4.8 |
| NAI REALM | 263 | 8.4.4.9 |
| 3GPP CELLULAR NETWORK | 264 | 8.4.4.10 |
| AP GEOSPATIAL LOCATION | 265 | 8.4.4.11 |
| AP CIVIC LOCATION | 266 | 8.4.4.12 |
| AP LOCATION PUBLIC IDENTIFIER URI | 267 | 8.4.4.13 |
| DOMAIN NAME | 268 | 8.4.4.14 |
| EMERGENCY ALERT IDENTIFIER URI | 269 | 8.4.4.15 |
| TDLS CAPABILITY | 270 | 8.4.4.17 |
| EMERGENCY NAI | 271 | 8.4.4.16 |
| NEIGHBOR REPORT | 272 | 8.4.4.18 |
| RESERVED | 273-56796 | N/A |
| VENDOR SPECIFIC | 56797 | 8.4.4.7 |
| RESERVED | 56798-65535 | N/A |

FIG. 12

SYSTEM AND METHOD FOR COMMON ATTRIBUTES IN HESSID AND THE ASSOCIATED QUERIES

This application claims the benefit of U.S. Provisional Application No. 61/723,269 filed on Nov. 6, 2012, entitled "System and Method for Providing Common Attributes in HESSID and the Associated Queries," which is incorporated herein by reference as if reproduced in its entirety.

TECHNICAL FIELD

The present invention relates to a system and method for wireless communications, and, in particular embodiments, to a system and method for providing common attributes in homogeneous extended service set identification (HESSID) and the associated queries.

BACKGROUND

Mobile stations (STAs) may attach to Wi-Fi access points (APs) in order to connect to wireless local area networks (WLANs). Prior to attachment/association, a STA may determine capabilities/attributes of a Wi-Fi AP through Access Network Query Protocol (ANQP) discovery. Conventional ANQP discovery techniques allow STAs to retrieve discovery information that is specific to a responding AP. However, modern day Wi-Fi hotspots may include multiple APs that share at least some similar capabilities/attributes. Accordingly, techniques for allowing STAs to efficiently determine discovery information that is common to multiple APs in a Wi-Fi hotspot are desired.

SUMMARY OF THE INVENTION

Technical advantages are generally achieved, by embodiments of this disclosure which describe systems and methods for providing common attributes in homogeneous extended service set identification (HESSID) and the associated queries In accordance with an embodiment, a method for wireless local area network (WLAN) discovery is provided. In this example, the method includes detecting a basic service set (BSS) identifier (BSSID) of a responding STA, generating an Access Network Query Protocol (ANQP) request that is configured to query dependent BSSID parameters of the responding STA, and encapsulating the ANQP request into a Generic Advertisement Service (GAS) request that includes an Association Message Exchange BSS Identification (BSSID) Independent (PAME-BI) bit. The method further includes setting a PAME-BI bit of the GAS request to a first value if the ANQP request is querying independent BSS parameters in addition to the dependent BSS parameters and sending the GAS request to the responding STA. An apparatus for performing this method is also provided.

In accordance with another embodiment, another method for wireless local area network (WLAN) discovery is provided. In this example, the method includes detecting a basic service set (BSS) identifier (BSSID) of a responding STA, generating an Access Network Query Protocol (ANQP) request that is configured to query dependent BSSID parameters of the responding STA. The ANQP request includes an Association Message Exchange BSS Identification (BSSID) Independent (PAME-BI) bit. The method further includes setting the PAME-BI bit of the ANQP request to a first value if the ANQP request is querying independent BSS parameters in addition to the dependent BSS parameters and sending the ANQP request to the responding STA. An apparatus for performing this method is also provided. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 7 illustrates a diagram of a GAS Initial Request frame body format;

FIG. 8 illustrates a diagram of a GAS Initial Response frame body format;

FIG. 12 illustrates a table of ANQP elements;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
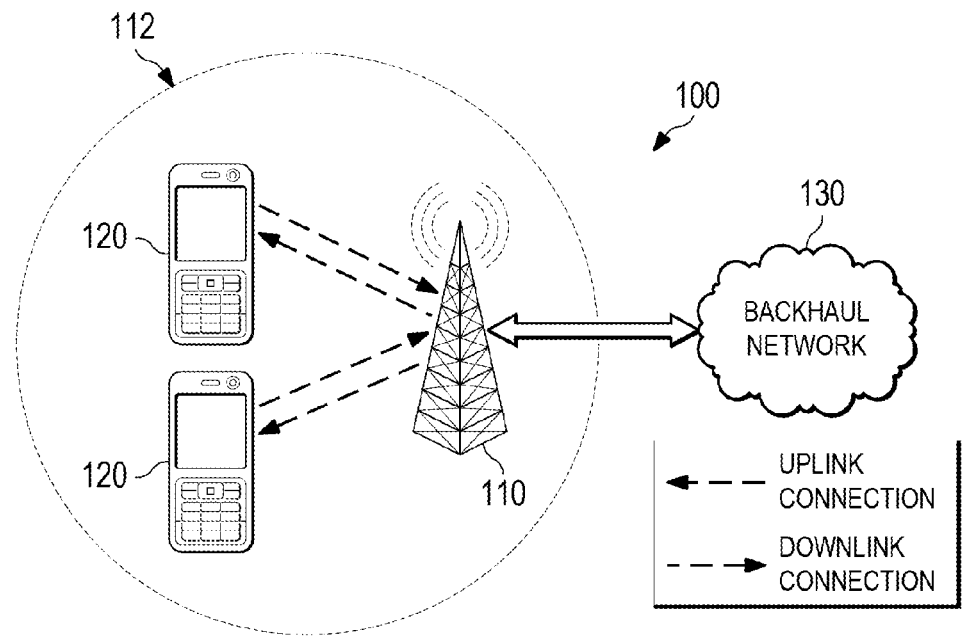
FIG. 1 illustrates a diagram of a wireless network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. WLANs are networks operating in accordance with the institute of Electrical and Electronics Engineers (IEEE) standard 802.11-2012, which is incorporated herein by reference as if reproduced in its entirety. Hotspot 2.0 Release 2 Technical Specs may also include information related to this disclosure, and is hereby incorporated by reference as if reproduced in its entirety.

In Wi-Fi hot-spots, each Wi-Fi AP is assigned a basic service set (BSS) identifier (BSSID), which is used to uniquely identify the Wi-Fi AP during, inter alia, ANQP discovery. Conventional ANQP discovery techniques return dependent BSS parameters that are specifically associated with a BSSID of a single candidate AP. More specifically, a roaming STA may detect a beacon specifying a BSSID of a candidate AP, and thereafter send an ANQP query specifying the BSSID to the candidate AP. The ANQP query is typically encapsulated within a Generic Advertisement Service (GAS) request frame, which is a generic container used to transport higher-layer advertisements prior to mobile station authentication. The ANQP query may be forwarded to an ANQP server, which may return an ANQP response listing a set of dependent BSS parameters specifically associated with the BSSID of the candidate AP. The ANQP response may be forwarded to the STA via a GAS response message, thereby notifying the STA of the dependent BSS parameters.

Some Wi-Fi hotspots include multiple APs that share common BSS parameters, which are referred to as independent BSS parameters. For instance, two or more APs may be interconnected to form an extended service set (ESS), and consequently may have the same security/network capabilities and/or attributes. As another example, two or more neighboring APs may share one or more common attributes when they are operated by the same network access provider (NAP) or manufactured by the same vendor. Conventional ANQP allows STAs to query dependent BSS parameters associated with a single BSSID, but does not allow STAs to specifically request/identify independent BSS parameters that are common to multiple APs to more efficiently discover common AP attributes as well as to reduce overhead in subsequent ANQP discovery exchanges. For example, a STA that learns of independent BSS parameters during an earlier ANQP exchange may be able to query fewer BSS parameters in subsequent ANQP exchanges, or to otherwise avoid one or more subsequent ANQP exchanges altogether (e.g., if the STA is only concerned with verifying that the neighboring APs have a BSS parameter included in or excluded from the list of independent BSS parameters. Accordingly, mechanisms for querying independent BSS parameters during ANQP discovery are desired.

Aspects of this disclosure allow requesting STAs to query independent BSS parameters by setting a Pre-Association Message Exchange BSSID Independent (PAME-BI) bit of a GAS request message used to transport the ANQP query. More specifically, a requesting STA may set the PAME-BI bit in a GAS request message to a first value (e.g., zero) to indicate that the accompanying ANQP query is requesting both independent and dependent BSS parameters. Alternatively, the PAME-BI bit can be set to a second value (e.g., one) to indicate that the ANQP query is requesting only dependent BSS parameters. In some embodiments, the PAME-BI bit is included as a field in the ANQP query, rather than the GAS request message. Aspects of this disclosure may be equally applicable to ANQP/GAS procedures occurring subsequent to mobile station authentication/association. These and other aspects are described in greater detail below.

FIG. 1 illustrates a network 100 for communicating data. The network 100 comprises an access point (AP) 110 having a coverage area 112, a plurality of stations (STAs) 120, and a backhaul network 130. The AP 110 may comprise any component capable of providing wireless access by, inter alia, establishing uplink (dashed line) and/or downlink (dotted line) connections with the STAs 120, such as a base station, an enhanced base station (eNB), a femtocell, and other wirelessly enabled devices. The STAs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
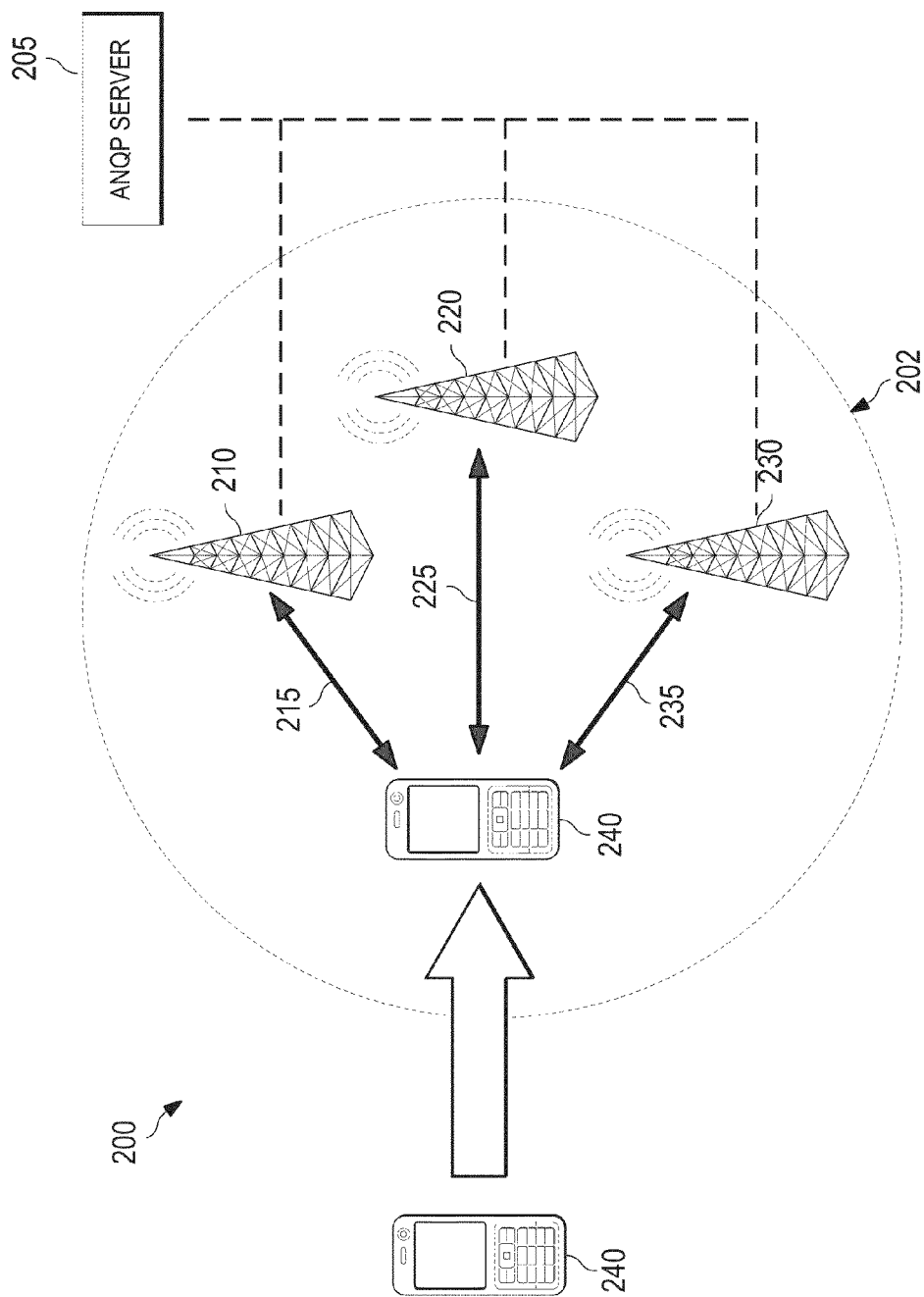
FIG. 2 illustrates a diagram of a network architecture for supporting a conventional ANQP discovery technique.

STAs may perform ANQP discovery upon roaming into a Wi-Fi hotspot or coverage area. FIG. 2 illustrates a network 200 comprising APs 210-230 configured to provide wireless access in a coverage area 202. The APs 210, 220, 230 are assigned BSSID_1, BSSID_2, and BSSID_3. The APs 210, 220, 230 share at least some common attributes/capabilities, and as a result, one or more independent BSS parameters may be collectively associated with the BSSID_1, the BSSID_2, and the BSSID_3. Moreover, a unique set of dependent BSS parameters are associated with each of the BSSID_1, BSSID_2, and BSSID_3.

The STA 240 is configured to perform conventional ANQP discovery, and therefore must execute separate ANQP discovery exchanges 215, 225, 235 with each of the APs 210, 220, 230 (respectively) in order to determine their respective dependent BSS parameters. Performing multiple ANQP discovery exchanges may be duplicative and/or unnecessary in situations where the APs 210-230 share large numbers of independent BSS parameters.

Aspects of this disclosure provide embodiment ANQP discovery techniques that allow STAs to discover independent BSS by setting a PAME-BI bit of a GAS request message. Notably, this may allow a requesting STA to discover attributes/capabilities shared by multiple APs using a single ANQP discovery exchange. The independent BSS parameters may be separate from the dependent BSS parameters. For instance, the dependent BSS parameters may describe those attributes that are associated with a specific BSSID, but that are not associated with the other BSSIDs. Alternatively, independent BSS parameters may be a subset of dependent BSS parameters in the sense that a subset of the BSS dependent parameters have the same values for multiple BSS. For instance, a set of dependent BSS attributes may define all attributes associated with a given BSSID, and the independent BSS attributes may indicate which of the dependent BSS attributes are commonly associated with all BSSIDs in the group.

Figure 3:
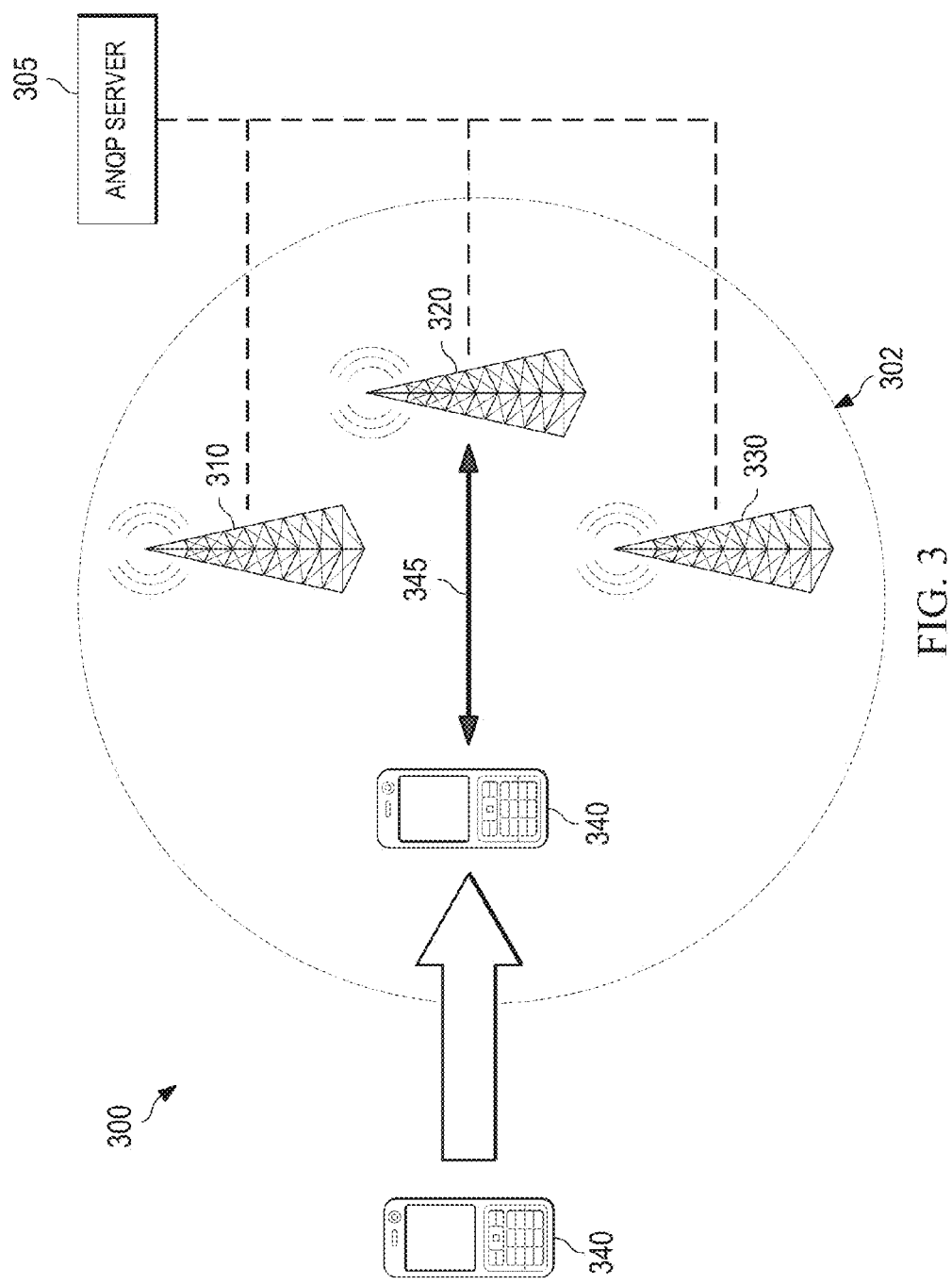
FIG. 3 illustrates a diagram of a network architecture for supporting an embodiment ANQP discovery technique.

FIG. 3 illustrates a network 300 in which a STA 340 is configured to perform an embodiment ANQP discovery technique upon roaming into a coverage area 302. As shown, the network 300 includes APs 310-330 configured to provide wireless access in a coverage area 302. The APs 310, 320, 330 are assigned BSSID_1, BSSID_2, and BSSID_3, respectively. The APs 310, 320, 330 share at least some common attributes/capabilities, and consequently the BSSID_1, the BSSID_2, and the BSSID_3 are collectively associated with one or more independent BSS parameters describing those common attributes/capabilities.

The STA 340 is configured to perform an embodiment ANQP discovery exchange 345 to obtain independent BSS parameters describing common attributes/capabilities shared between the APs 310, 320, 330. The ANQP discovery exchange 345 is achieved by encapsulating an ANQP query specifying BSSID_2 within a GAS initial request message. A PAME-BI bit of the GAS message is set to a value (e.g., zero) to indicate that the accompanying ANQP query is requesting independent BSS parameters in addition to dependent BSS parameters. The AP 320 relays the ANQP query to the ANQP server 305, which provides dependent and independent BSS parameters in an ANQP response message. The ANQP response message is forwarded to the requesting STA 340 via a GAS response message.

Figure 4:
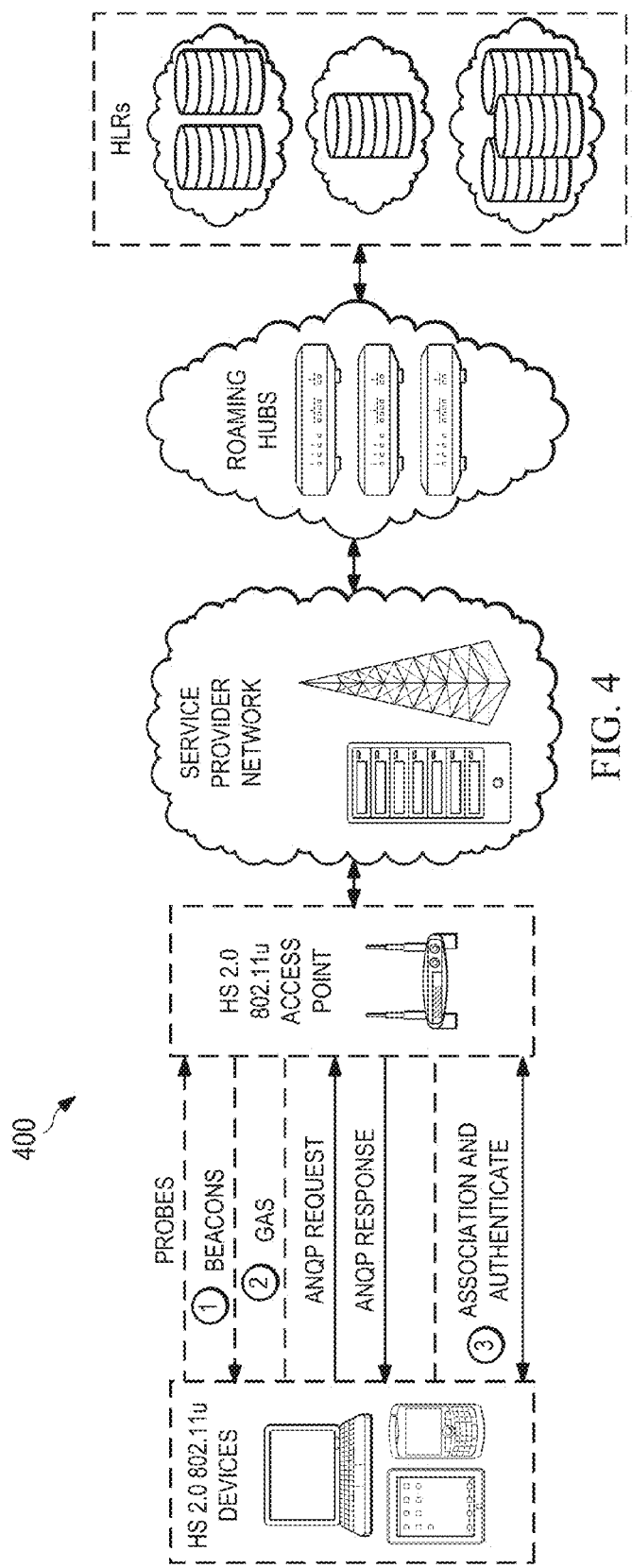
FIG. 4 illustrates a diagram of a network architecture for supporting ANQP discovery.

FIG. 4 illustrates a network architecture 400 for performing an Access Network Query Protocol (ANQP) operation.

As shown, STAs wanting to connect to a Wi-Fi network may scan an area for available Wi-Fi APs by, inter alia, detecting beacons and/or exchanging probe request/response messages. Once identified, the STA and Wi-Fi APs may exchange ANQP query requests and responses so that the STA may discover different features of the Wi-Fi APs. As discussed herein, STAs may include any wirelessly enabled device, such as a cell phone, laptop, tablet, smart sensor, handheld or consumer electronic device, and other user devices. STAs may comprise a Wi-Fi interface for accessing Wi-Fi networks, as well as other interfaces for interacting with other types of communication networks, such as a cellular network. An access point (AP) and one or more STAs can form a basic service set (BSS), which is the basic building block of an IEEE 802.11 wireless local area network (WLAN). An AP may communicate with an AP controller or an ANQP server, which can be collocated or not with the AP. A BSS generally can be identified by a service set identifier (SSID), which is configured and may be broadcasted by the AP. A BSS also is identified by the BSSID, which is the MAC address of the AP. A SSID could be shared by several BSS, but the BSSID is unique for a BSS.

Figure 5:
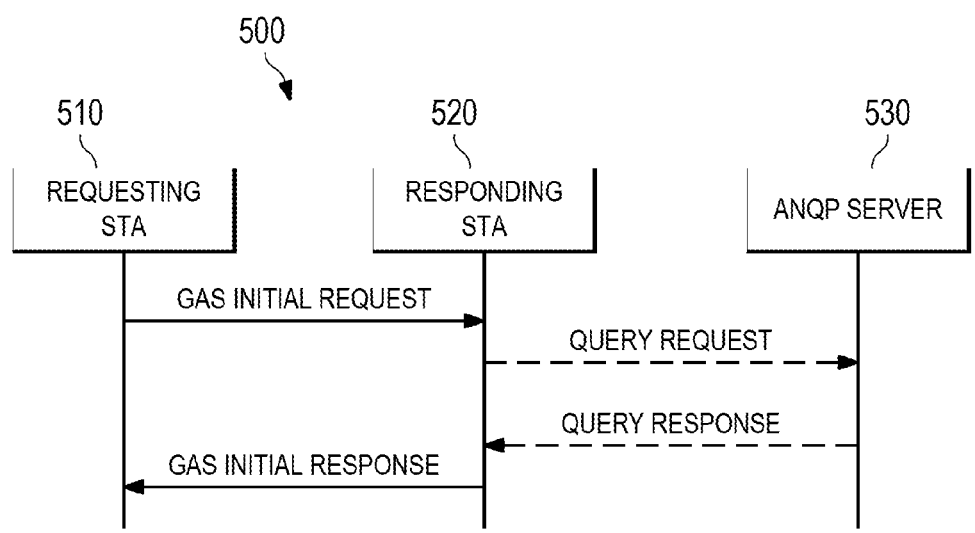
FIG. 5 illustrates a protocol diagram of an embodiment GAS discovery procedure.

FIG. 5 illustrates an embodiment GAS message exchange 500 between a requesting STA 510, a responding STA 520, and an ANQP server 530. As shown, the requesting STA sends a GAS initial request to the responding STA 520. The GAS initial request may include an ANQP query that specifies a BSSID and a PAM-BI bit that may indicate whether the ANQP query is requesting independent. The ANQP query may be forwarded from the responding STA 520 to the ANQP server 530 via another transport protocol. The ANQP server 530 may respond with an ANQP response message that lists dependent BSS parameters associated with the BSS ID specified by the ANQP query. The ANQP response message may also include independent BSS parameters when the PAM-BI bit indicates that independent BSS parameters are being queried. The ANQP response may be relayed from the responding STA 520 to the requesting STA 510 using a GAS response message.

Figure 6:
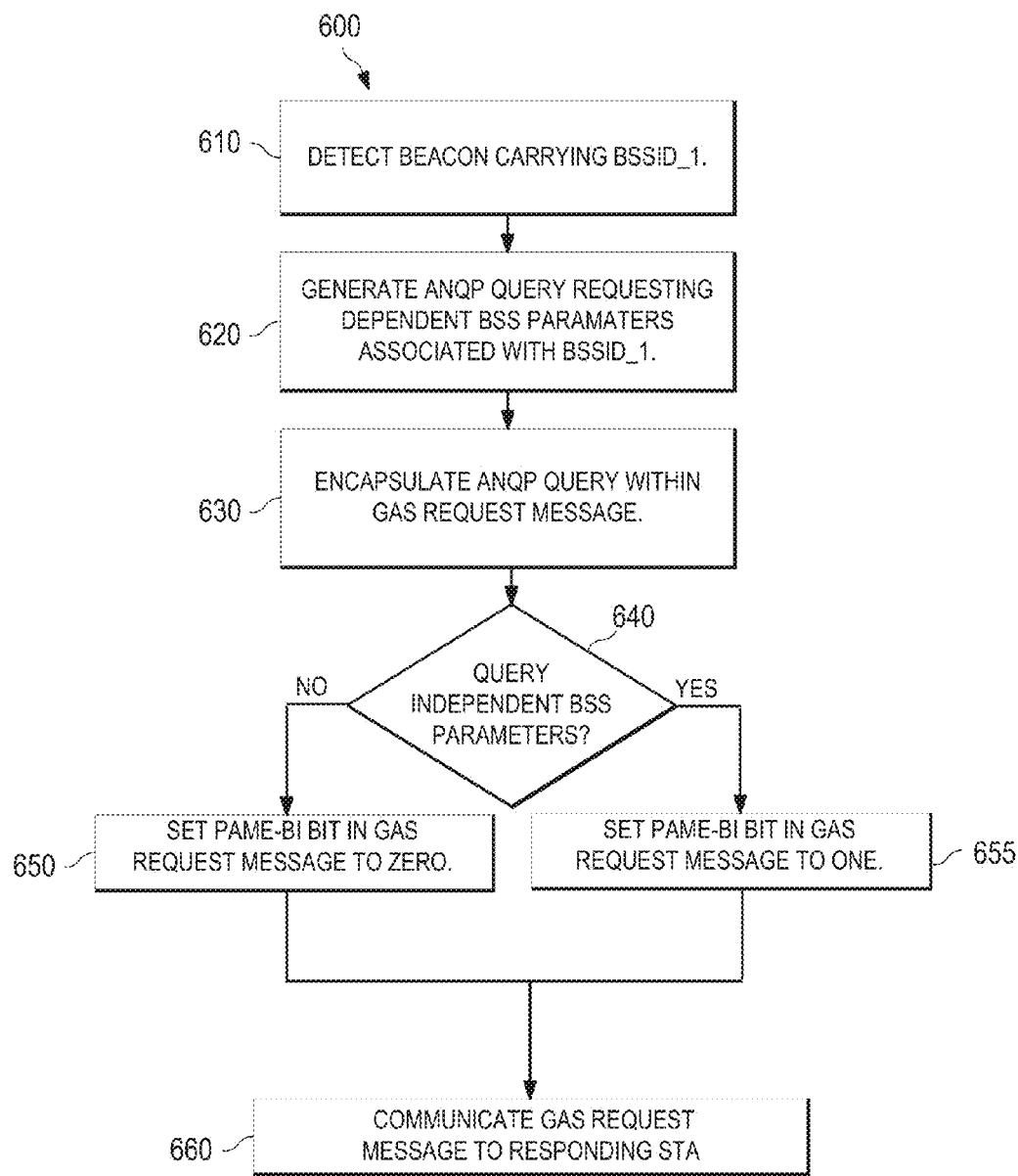
FIG. 6 illustrates a flowchart of an embodiment method for performing ANQP discovery using GAS transport containers.

FIG. 6 illustrates a method 600 for querying BSS parameters, as might be performed by a requesting STA. As shown, the method 600 begins with step 610, where the requesting STA detects a beacon carrying a BSSID (BSSID_1) assigned to a Wi-Fi AP. Next, the method 600 proceeds to step 620, where the requesting STA generates an ANQP query specifying the BSSID_1 in order to request dependent BSS parameters associated with BSSID_1. Thereafter, the method 600 proceeds to step 630, where the requesting STA encapsulates the ANQP query within a GAS request message. Subsequently, the method 600 proceeds to step 640, where the requesting STA elects whether to query independent BSS parameters. If the STA elects not to query independent BSS parameters, then the method 600 proceeds to step 650, where the STA sets a PAME-BI bit of the GAS request message to zero. Alternatively, if the STA decides to query independent BSS parameters, the method 600 proceeds to step 655, where the STA sets the PAME-BI bit of the GAS request message to one. While the PAME-BI bit is described as being set to zero or one in this example, the PAME-BI bit can be set to any value(s) to indicate whether or not independent BSS parameters are being requested. Following step 650 or step 655, the method proceeds to step 660, where the requesting STA communicates the GAS request message to a responding STA.

Some dependent and independent BSS attributes/parameters are described in Institute of Electrical and Electronics Engineers (IEEE) 802.11 standards document 802.11REVmb D12.0, which is hereby incorporated by reference herein as if reproduced in its entirety. The Pre-Association Message Exchange BSSID Independent (PAME-BI) bit is traditionally used by an access point (AP) to indicate whether the Advertisement Server, which is the non-AP station's's peer for this Advertisement Protocol, returns a Query Response that is independent of the BSSID used for the Generic Advertisement Service (GAS) frame exchange. However, the actual queries do not allow open ended query formulation such as "return only the common attributes for this BSSID". Aspects of this disclosure extend use of the PAME-BI bit to allow independent BSS parameters to be queried prior to mobile device association. GAS may be used to enable network selection for stations (STAs) when the parameter dot11InterworkingServiceActivated is set to true. GAS provides transport mechanisms for advertisement services while STAs are in the unassociated state as well as the associated state. This is accomplished via the use of Public Action management frames, which are Class-1 frames. GAS messages are transmitted using individually addressed Public Action frames. A GAS message exchange may take place between two STAs, with one STA transmitting a GAS Query Request and the other STA transmitting the GAS Query Response. STAs may refer to mobile devices, APs, or any other device that communicates wirelessly in a Wi-Fi network.

Figure 9:
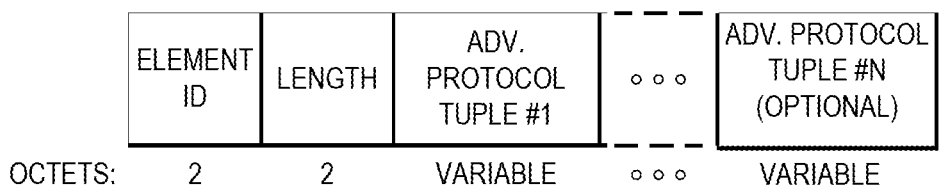
FIG. 9 illustrates a diagram of an Advertisement Protocol element.
Figure 10:
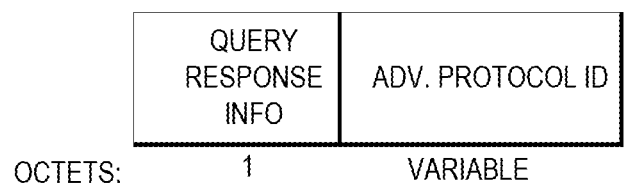
FIG. 10 illustrates a diagram of an advertisement protocol tuple field.

The GAS Initial Request frame is a Public Action frame. It is transmitted by a requesting STA to request information from another STA. FIG. 7 illustrates a GAS Initial Request frame body format. The GAS Initial Response frame is a Public Action frame. It is transmitted by a STA responding to a GAS Initial Request frame. FIG. 8 illustrates a GAS Initial Response frame body format. Advertisement Protocol elements contain information identifying a particular advertisement protocol and its corresponding Advertisement Control. FIG. 9 illustrates an Advertisement Protocol element format that includes an element ID field, a length field, and one or more advertisement protocol tuple fields. FIG. 10 illustrates an advertisement protocol tuple field format that includes query response information field and an advertisement protocol ID field.

Figure 11:
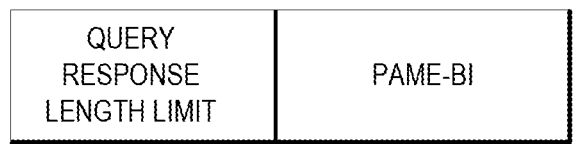
FIG. 11 illustrates a diagram of an embodiment Query Response Information field format.

FIG. 11 illustrates a Query Response Information field format that includes a query response length limit field and a PAME-BI field. The PAME-BI field may be set to zero or one depending on whether independent BSS parameters are being queried. The Pre-Association Message Exchange BSSID Independent (PAME-BI) bit is used by an AP to indicate whether the Advertisement Server, which is the non-AP STA's peer for this Advertisement Protocol, returns a Query Response that is independent of the BSSID used for the GAS frame exchange. This bit is set to 1 to indicate the Query Response is independent of the BSSID; it is set to 0 to indicate that the Query Response may be dependent on the BSSID. The Advertisement Protocol ID field may be set to zero to indicate that the GAS message carries an ANQP query/response. FIG. 12 illustrates a table of ANQP elements that may be queried using an ANQP request message protocol. ANQP query request may use the Query List ANQP-element comprising ANQP-elements Info IDs that have an ANQP-element type of S. The ANQP query request is transported in the Query Request field of GAS Request frames. The ANQP query response is transported in the Query Response field of GAS Response frames.

This disclosure proposes a new method to indicate the common ANQP attributes in a homogeneous extended service set identification (HESSID) and a query method to request the common attributes. A new type of query is proposed, where the query sender specifies if the sender wants to query only the dependent basic service set (BSS) parameters or both the dependent and the independent BSS parameters. The query request format proposed is the initial GAS request with Advertisement Protocol element (e.g., code 3) having an Advertisement Protocol ID set to zero and a PAME-BI bit set to either zero or one depending on whether independent BSS parameters are desired. If the PAME-BI indicates that the independent parameters are desired, then the responding STA (e.g., the AP) notifies the ANQP server that independent BSS parameters are being queried in addition to the dependent BSS parameters. This notification can be executed in a variety of ways. For example, the responding STA may modify the ANQP query prior to forwarding the ANQP query to the ANQP server, e.g., append or embed the PAMI-BI bit in the ANQP query, etc. Alternatively, the responding STA may include an indication in a priority protocol message used to transport the ANQP query from the responding STA to the ANQP server. As yet a further alternative, the PAME-BI bit may be embedded in the ANQP query by the requesting server prior to the ANQP query being encapsulated within the GAS message.

Requesting STAs may adjust subsequent queries to other APs when independent BSS parameters are obtained via an ANQP/GAS exchange, thereby reducing the overhead of those subsequent queries. In an embodiment, the BSSID dependent and independent parameters are located in the ANQP server. The server record keeps additional information for each ANQP attribute to specify if the attribute is BSSID dependent or not. The server distinguishes the BSS dependent from the BSS independent attributes by keeping additional information on each attribute, storing the information in separate data structure or other methods. The filtering based on the BSSID independent or not value may be done at the ANQP server level based on the GAS request format and BSSID value.

Dependent and independent BSS attributes can be distinguished from one another in a variety of ways. In one example, the dependent and independent BSS attributes are listed in a single group of attribute fields, with each attribute field having an indicator (e.g., a PAME-BI indicator or otherwise) that specifies whether the corresponding BSS attribute is independent or dependent. Alternatively, dependent BSS attributes are listed in first group of attribute fields and independent BSS attributes are listed in a second group of attribute fields. The first and second groups of attribute fields may be differentiated using an indicator bit (e.g., PAM-BI bit or otherwise). As yet a further alternative, dependent BSS attributes may be provided by the corresponding AP, and independent BSS attributes may be provided by the ANQP server. In that case, APs may only provide their own dependent BSS attributes. The dependent BSS attributes may be stored locally in the AP or remotely in the ANQP server. When a ANQP stores attributes for multiple BSSIDs, the ANQP may create a new entry for each BSSID. When an AP forwards a request to the ANQP server, the ANQP server matches the AP address to a BSSID and then returns the corresponding attributes to the corresponding AP. The BSSID entry for an AP in the ANQP records may be manually specified by the operator or dynamically updated by the AP during an initialization of the ANQP records. As yet a further alternative, dependent and independent BSS attributes may be provided in separate ANQP response messages. The messages may have a different PAME-BI indicator value to indicate whether the message carries independent or dependent BSS parameters. In another embodiment, multiple ANQP servers may be distributed at AP locations. In such embodiments, the ANQP servers may communicate and/or manage independent/dependent BSS parameters in a distributed manner. By way of example, the distributed ANQP servers may collectively determine which BSS parameters are dependent/independent. For instance, a distributed ANQP server at a first AP may decide that an independent BSS parameter should be changed to a dependent BSS parameter, and may inform other ANQP servers located at APs in the same homogeneous extended service set (HESS) as the first AP. In some embodiments, sets of independent and/or dependent BSS parameters may be associated with a life time duration, in which case a STA may utilize a remaining lifetime (e.g., identified via ANQP protocol) to determine when to query updated BSS parameters.

Figure 13:
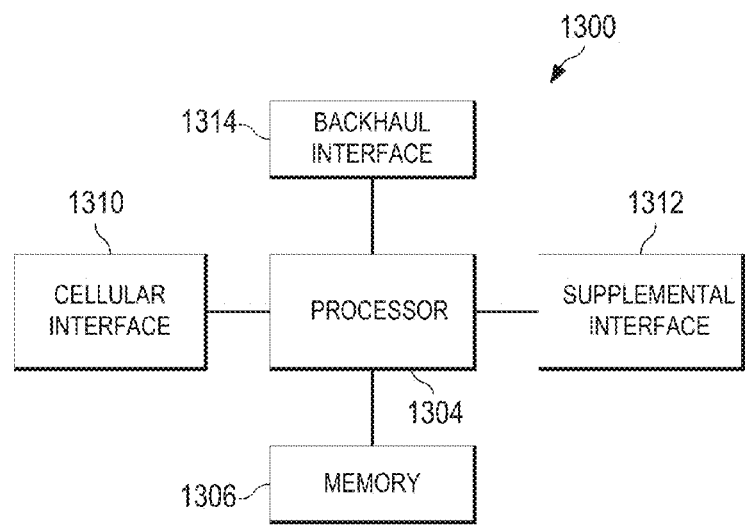
FIG. 13 illustrates a block diagram of an embodiment communications device.

FIG. 13 illustrates a block diagram of an embodiment of a communications device 1300, which may be equivalent to one or more devices (e.g., UEs, NBs, etc.) discussed above. The communications device 1300 may include a processor 1304, a memory 1306, a cellular interface 1310, a supplemental interface 1312, and a backhaul interface 1314, which may (or may not) be arranged as shown in FIG. 13. The processor 1304 may be any component capable of performing computations and/or other processing related tasks, and the memory 1306 may be any component capable of storing programming and/or instructions for the processor 1304. The cellular interface 1310 may be any component or collection of components that allows the communications device 1300 to communicate using a cellular signal, and may be used to receive and/or transmit information over a cellular connection of a cellular network. The supplemental interface 1312 may be any component or collection of components that allows the communications device 1300 to communicate data or control information via a supplemental protocol. For instance, the supplemental interface 1312 may be a non-cellular wireless interface for communicating in accordance with a Wireless-Fidelity (Wi-Fi) or Bluetooth protocol. Alternatively, the supplemental interface 1312 may be a wireline interface. The backhaul interface 1314 may be optionally included in the communications device 1300, and may comprise any component or collection of components that allows the communications device 1300 to communicate with another device via a backhaul network.

Figure 14:
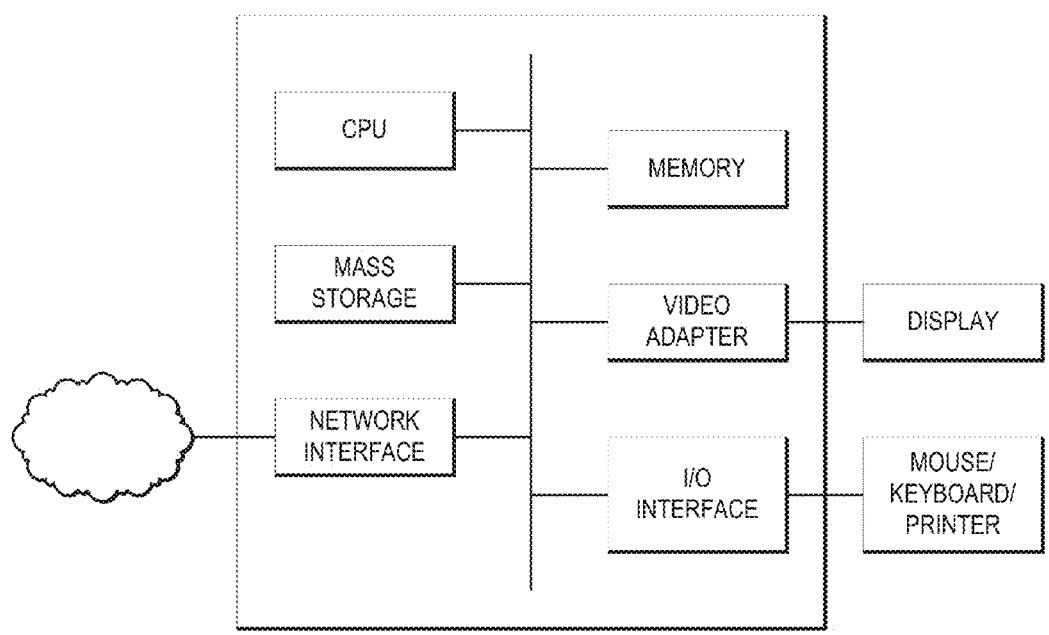
FIG. 14 illustrates a block diagram of an embodiment computing platform.

FIG. 14 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for wireless local area network (WLAN) discovery, the method comprising:
   detecting, by a requesting station (STA), multiple basic service set (BSS) identifiers (BSSIDs) each of which associated with a different one of a plurality of responding STAs;
   encapsulating, by the requesting STA, multiple Access Network Query Protocol (ANQP) requests into a single Generic Advertisement Service (GAS) request, each of the multiple ANQP requests including a different one of the multiple BSSIDs to request dependent BSS parameters for a different one of the plurality of responding STAs; and
   sending, by the requesting STA, the single GAS request to at least one of the responding STAs, the single GAS request requesting dependent BSS parameters for each of the plurality of responding STAs.

2. The method of claim 1, wherein the dependent BSS parameters requested by a given one of the multiple ANQP requests describe attributes uniquely associated with the BSSID in the given ANQP request.

3. The method of claim 1, further comprising:
   receiving, by the requesting STA, a single GAS response from one of the plurality of responding STAs.

4. The method of claim 3, wherein multiple ANQP response messages are encapsulated within the single GAS response.

5. The method of claim 4, wherein each of the ANQP response messages encapsulated within the single GAS response identify dependent BSS parameters of a different one of the plurality of responding STAs.

6. The method of claim 5, wherein each of the ANQP response messages encapsulated within the single GAS response identify dependent BSS parameters requested by a different one of the ANQP request message encapsulated within the single GAS request.

7. The method of claim 6, wherein the plurality of responding STAs are a group of wireless APs.

8. The method of claim 7, wherein the requesting STA is a non-AP STA.

9. A requesting station (STA) comprising:
   a non-transitory memory storage comprising instructions; and
   one or more processors in communication with the memory, wherein the one or more processors execute the instructions to:
   detect multiple basic service set (BSS) identifiers (BSSIDs) each of which associated with a different one of a plurality of responding STAs;
   encapsulate multiple Access Network Query Protocol (ANQP) requests into a single Generic Advertisement Service (GAS) request, each of the multiple ANQP requests including a different one of the multiple BSSIDs to request dependent BSS parameters for a different one of the plurality of responding STAs; and
   send the single GAS request to at least one of the responding STAs, the single GAS request requesting dependent BSS parameters for each of the plurality of responding STAs.

10. The requesting STA of claim 9, wherein the dependent BSS parameters requested by a given one of the multiple ANQP requests describe attributes uniquely associated with the BSSID in the given ANQP request.

11. The requesting STA of claim 9, wherein the one or more processors further execute the instructions to:
    receive a single GAS response from one of the plurality of responding STAs.

12. The requesting STA of claim 11, wherein multiple ANQP response messages are encapsulated within the single GAS response.

13. The requesting STA of claim 12, wherein each of the ANQP response messages encapsulated within the single GAS response identify dependent BSS parameters of a different one of the plurality of responding STAs.

14. The requesting STA of claim 13, wherein each of the ANQP response messages encapsulated within the single GAS response identify dependent BSS parameters requested by a different one of the ANQP request message encapsulated within the single GAS request.

15. The requesting STA of claim 14, wherein the plurality of responding STAs are a group of wireless APs.

16. The requesting STA of claim 15, wherein the requesting STA is a non-AP STA.

17. A requesting station (STA) comprising:
a detector that detect multiple basic service set (BSS) identifiers (BSSIDs) each of which associated with a different one of a plurality of responding STAs;
an encapsulating element that encapsulate multiple Access Network Query Protocol (ANQP) requests into a single Generic Advertisement Service (GAS) request, each of the multiple ANQP requests including a different one of the multiple BSSIDs to request dependent BSS parameters for a different one of the plurality of responding STAs; and
a transmitter that send the single GAS request to at least one of the responding STAs, the single GAS request requesting dependent BSS parameters for each of the plurality of responding STAs.

18. The requesting STA of claim 17, wherein the dependent BSS parameters requested by a given one of the multiple ANQP requests describe attributes uniquely associated with the BSSID in the given ANQP request.

19. The requesting STA of claim 17, further comprise:
a receiver that receives a single GAS response from one of the plurality of responding STAs.

20. The requesting STA of claim 19, wherein multiple ANQP response messages are encapsulated within the single GAS response.

21. The requesting STA of claim 20, wherein each of the ANQP response messages encapsulated within the single GAS response identify dependent BSS parameters of a different one of the plurality of responding STAs.

22. The requesting STA of claim 21, wherein each of the ANQP response messages encapsulated within the single GAS response identify dependent BSS parameters requested by a different one of the ANQP request message encapsulated within the single GAS request.

23. The requesting STA of claim 22, wherein the plurality of responding STAs are a group of wireless APs, and wherein the requesting STA is a non-AP STA.

* * * * *